United States Patent [19]
Dunlap et al.

[11] Patent Number: 5,177,618
[45] Date of Patent: Jan. 5, 1993

[54] DUAL DECK VCR AND DUPLICATING CIRCUIT THEREFOR

[75] Inventors: R. Terren Dunlap, Scottsdale; John R. Berkheimer, Tempe, both of Ariz.; C. Duane Woodmas, Emporia, Kans.

[73] Assignee: Go-Video, Inc., Scottsdale, Ariz.

[21] Appl. No.: 546,360

[22] Filed: Jun. 29, 1990

[51] Int. Cl.⁵ .................................. H04N 5/782
[52] U.S. Cl. .................... 358/335; 358/336; 360/15; 360/70; 380/5; 380/15
[58] Field of Search .......... 358/194.1, 310, 314, 358/335, 336; 360/15, 33.1, 38.1, 76, 70; 369/84; 380/5, 15

[56] References Cited

U.S. PATENT DOCUMENTS

| | | | |
|---|---|---|---|
| 4,628,371 | 12/1986 | Kuroda | 360/19.1 X |
| 4,631,603 | 12/1986 | Ryan | 360/15 X |
| 4,768,110 | 8/1988 | Dunlap et al. | 360/15 X |
| 4,916,548 | 4/1990 | Morioka et al. | 360/23 X |
| 4,937,679 | 6/1990 | Ryan | 360/60 X |

Primary Examiner—Wayne R. Young
Attorney, Agent, or Firm—Jerry Cohen; Harvey Kaye; Edwin H. Paul

[57] ABSTRACT

A dual deck video cassette recorder, having first and second video decks in a common housing. Each deck has a plurality of heads and both of the decks can playback, and at least one of the decks can record. A switch arrangement is connected to both decks to provide for selective connections of video and audio signals between, and from the inputs to and outputs from, the two decks. A sensor detects the angular position of the heads of each deck to assure they are in phase prior to initiating recording. A mechanism corrects the angular position of the heads of at least one of the decks to assure the heads of each will be in the same angular phase prior to initiating recording. A circuit detects a copy protection signal on a tape in one deck during vertical blanking and the signal is located and timed so that it will not interfere with normal operation of the video signals, to produce a quality picture on a TV monitor or place information onto tape in one deck which provides a quality picture. A circuit is provided for ceasing, and preventing, any copying function being performed when the copy protection signal has been detected, and it also determines, after the copy protection signal has be detected, that the signals at both decks have been synchronized for a predetermined period of time.

14 Claims, 8 Drawing Sheets

DUAL DECK VCR AND DUPLICATING CIRCUIT THEREFOR

CROSS REFERENCE TO RELATED APPLICATIONS

The present invention is related to and is an improvement on U.S. Pat. No. 4,768,110, and to copending application Ser. No. 230,181 filed Aug. 9, 1988, now pending, both of which are assigned to GO-Video, Inc., and both of which are hereby incorporated by reference into this application.

1. Field of the Invention

This invention relates generally to the video art, and, more particularly, to dual deck video cassette recorders ("VCRs").

2. Background of the Invention

The present invention is an improvement in dual deck VCRs, in which the user may selectively and simultaneously play from one deck while recording on the other deck. The dual deck VCR has a flexible switching arrangement whereby the user may choose from many input devices, including the other deck, to record on one deck, and many output devices, including the other deck, to play from one deck.

Conventional VCRs prior to Go-Video's U.S. Pat. No. 4,768,110 contained only one deck. These devices made relatively poor duplicaters and the cabling arrangements between VCRs and their simultaneous use is inconvenient.

BRIEF SUMMARY OF THE INVENTION

It is an object of the invention to provide a VCR circuit which provides simple tape copying control and which creates a tape copy having superior quality.

It is another object of the invention to provide a dual deck VCR circuit which provides simple tape duplication of the electronic video and audio signals which have been recorded on videocassette tape, and creates tape duplicates of superior quality.

It is another object of the invention to provide a VCR device which will not record from one tape to another if the source tape has a copy protect signal on it.

It is yet another object of the invention to provide a VCR device which will sense the presence of a "black box" intended to defeat the copy protection signal placed onto the source tape.

It is a further object of the present invention to provide a VCR which allows the programming of the dual deck VCR on screen by remote control.

It is yet a further object of the present invention to provide a system which produces superior copy in which color and detail is maintained better than any other duplication process, and especially for VHS, and in which this process can be activated in the VCR-2 with just a single one touch button.

It is still another object of the invention to provide another embodiment of a VCR circuit in which the copy protect signal on a source tape can be ignored and a good copy produced in spite of the presence of this signal.

It is yet another object of the invention to provide a dual deck VCR in which is extremely easy for a user to connect the necessary cables.

Other objects, features and advantages will be apparent from the following detailed description of preferred embodiments taken in conjunction with the accompanying drawings in which:

BRIEF DESCRIPTION OF THE DRAWINGS

FIG. 5-1 and 5-2 shows the Y/C circuit part of the block diagram of FIG. 1;

DETAILED DESCRIPTION OF THE DRAWINGS

Figure 1:
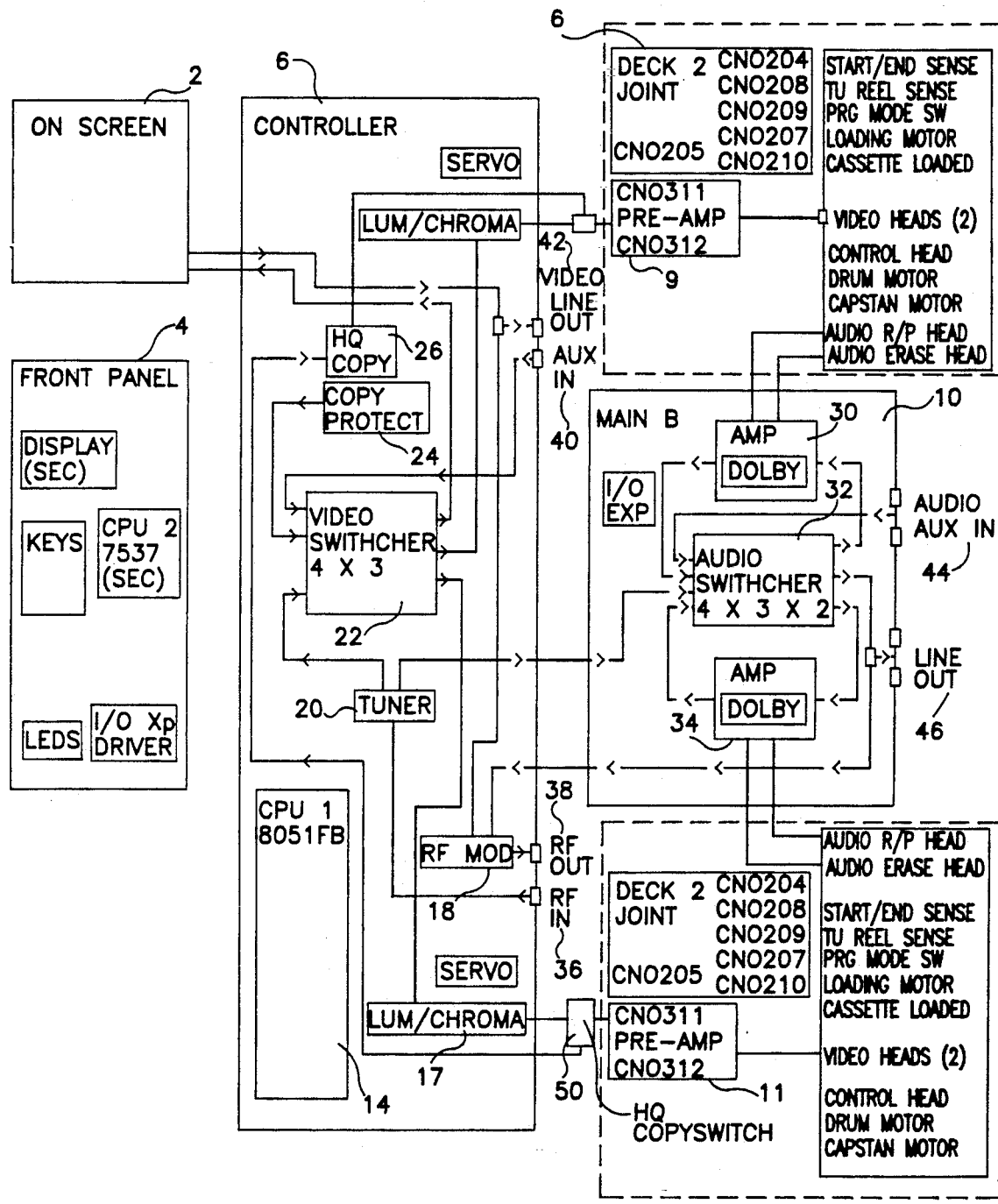
FIG. 1 is a block diagram of a dual deck VCR with multiple inputs and outputs incorporating a microprocessor controller and a multifunctional switching arrangement showing the system from the analog viewpoint.

FIG. 1 is a simplified block diagram of the audio and video switching selection arrangement used in the dual deck VCR of the present invention. There are several possible input sources to each deck. Video switcher 22 selects from an RF (radio frequency) input 36, an auxiliary video input 40, the luminance and chroma output 17 from deck 2 (deck 2 is designated 15 in FIG. 1) and the luminance and chroma output 29 from deck 1 (deck 1 is designated 8 in FIG. 1). The RF input is converted to video by the tuner 20, and the FM (frequency modulated) outputs from the tape heads are converted to video by the luminance (modulator/demodulator) and chroma (hetrodyning) blocks 29 and 17.

Figure 2:
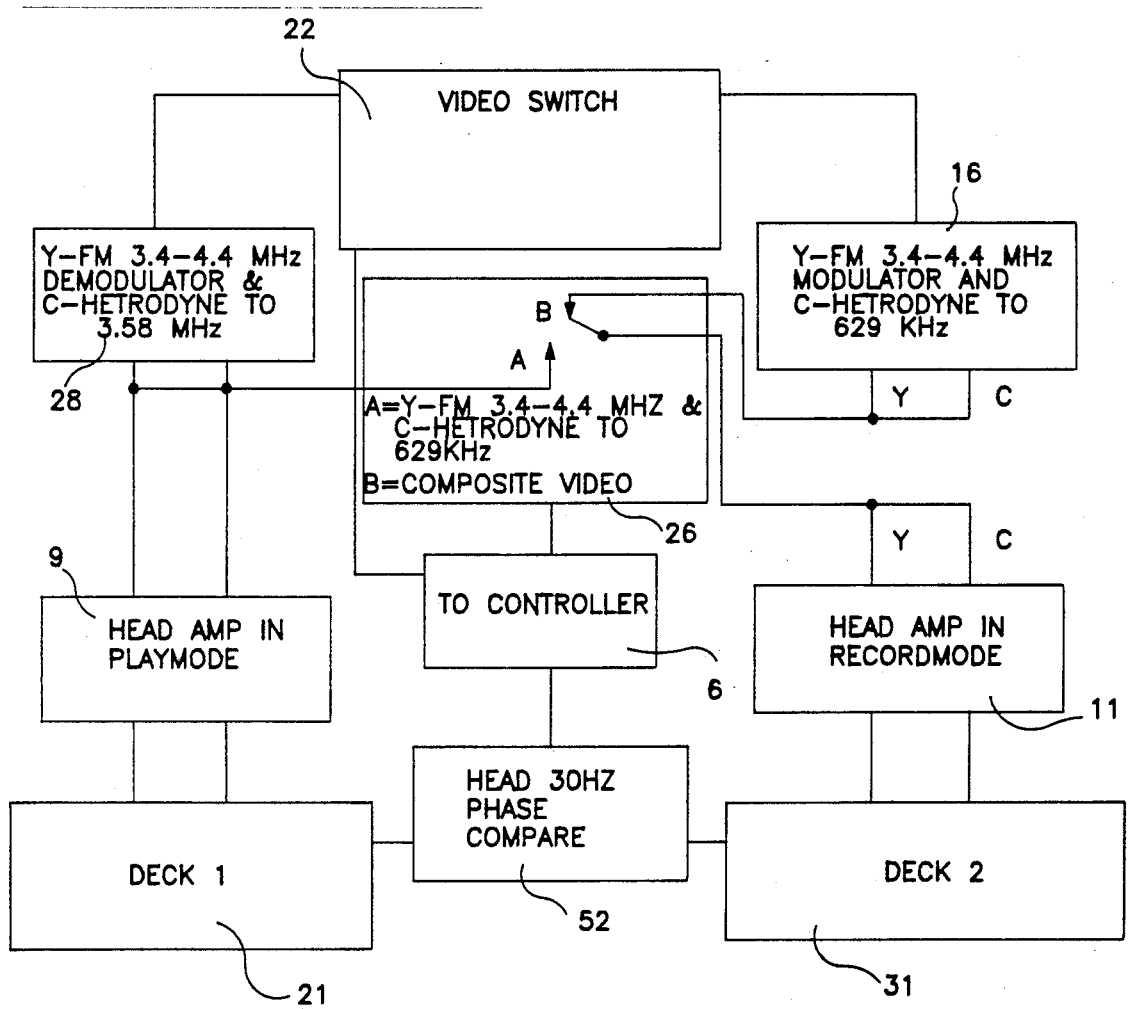
FIG. 2 is a block diagram showing the switching arrangement for duplicating, with deck 1 playing a tape which is being duplicated onto a tape in deck 2.

The video switcher 22 provides video outputs back to deck 1 via the demodulator block 28 and to deck 2 via modulator block 16 FIG. 2). The video switcher 22 also has a video output which is input through an on screen character generator 2 to a line output 42. This video output is connected to an RF modulator 18 which provides an RF output 38. The viewer can input information using the keys on the front panel 4. This information is input to the CPU 14 which forms the information into the video signal with the on-screen generator 2. Using this mechanism the viewer can date stamp or place titles into either deck, since either deck can be played through the switcher 22 and output through the on-screen character generator 2 to the line out 42 or the RF modulator 18 and output 38 to a television set for display.

The microprocessor 14 controls the operation of the dual deck VCR. The operator controls and monitors the operation via the front panel 4.

Block 10 is the audio switching arrangement. The read/play and erase heads signals from deck 1 are input to a Dolby amplifier 30, and the corresponding head signals from deck 2 are input to amplifier 34. The audio switcher 32, under the control of the microprocessor 14, selects the audio source consistent with the video selection switcher 22.

The present invention includes a system which produces superior copy in which color and detail is maintained better than any other duplication process, and especially for VHS, although it is also usable for Beta format, in which event the frequencies would differ slightly. For example, in Beta format the Y-FM lumina is 3.5-4.8 NHz and the C-hetrodyne is 688 KHz.. This process can be activated in the VCR-2 with just a single one touch button.

The CPU 14 provides for duplication from deck one to deck two as follows: first deck one is put into play; then the output composite amplified signal from the tape in deck one is routed to the input of deck two; however, this simplified signal is fed to an FM luminance and the FM chroma circuit 29; in this circuit 29 the luminance is amplified and run through a limiter to set the luminance at a constant level; the chroma is picked up after it has been processed to restore proper color burst levels; the chroma is still left at 629 KHz; the FM luminance and the FM chroma is routed though a switch 22 arranged to feed the input of deck 2 head amp; also at this point the level must be set properly for the head; deck two is placed in record pause; the servos for both heads are synchronized so that both 30 Hz head signals are in phase with each other; this assures that the azimuth of the two heads are matched; deck two is then placed in record and the duplication occurs.

FIG. 2 is a detailed block diagram of the switching arrangement used for duplicating a tape in the present invention as previously described. Consider a tape in deck 1 transport 21 to be duplicated onto a tape in deck 2 transport 31. The arrangement of switch 26 is to record the information on tape in deck 1 onto the tape in deck 2 as per the Y-FM lumina 3.4-4.4 MHz and C-hetrodyne process. When the tape in deck 1 is played an FM signal from the tape is received by the head amplifier 9. The head amplifier conditions and amplifies the signal making it suitable for the following electronics. If the HQ Copy switch 26 is set to the A or "Y-FM 3.4-4.4 MHz and C-hetrodyne" position as shown, the signal from the head amplifier 9 is connected directly through switch 26 to the head amplifier 11 which records onto the tape loaded in transport mechanism 31, creating a copy in transport mechanism 21. This copying method does not go through the intermediate steps of creating a video signal or an RF signal. The signal from the head amplifier 9 is an FM signal composed of the luminance signal (3.4 to 4.4 MHz) and a chroma signal (629 KHz). The luminance signal is amplified and limited to set a constant luminance level. The chroma is processed to restore proper color burst levels. These conditioned signals are routed to one side of the HQ Copy switch 26 which, as shown, connects these signals directly to the head amplifier 11 for the deck 2 transport.

The servos for the head drives in each transport must be synchronized with each other to assure the heads are matched for proper duplicating to occur. The 30 Hz head servo phase signals from each deck are input to phase compare circuitry 52, the controller 6 determines the time difference between the signals and modifies the servo drives until the servos are in phase. If the heads are not in phase the result will be a loss of chroma signal.

Even if the HQ Copy switch 26 is in the Y-FM 3.4-4.4 MHz and C-hetrodyne processing position the FM signal from deck 1 is demodulated to video in demodulator 28. With this configuration the copy protect 24 and HQ copy 26 circuits are operational and the CPU 14 will still be capable of preventing the copying of a protected tape. A copy using the video signal can be made as the demodulated signal is fed to the video switch 22. The output of the video switch 22 can be fed back through the FM modulator 16. If the copy switch 26 is set to connect the output of the FM modulator 16 to the head amplifier 11, then video signals can be recorded onto the tape in deck 2 transport 31. The arrangement of switch 26 is in the B-video duplicate or video composite position.

Figures 1, 5:
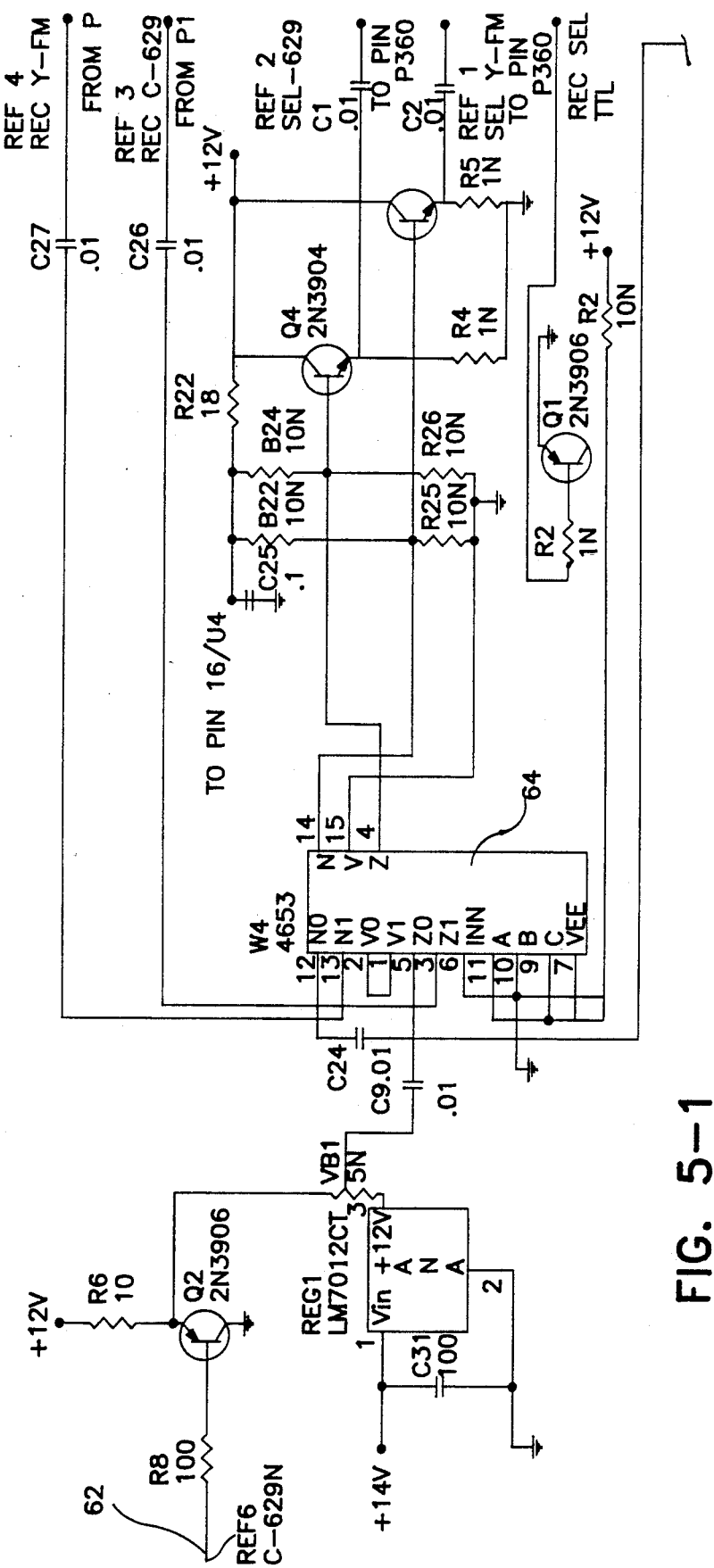
Figures 2, 5:
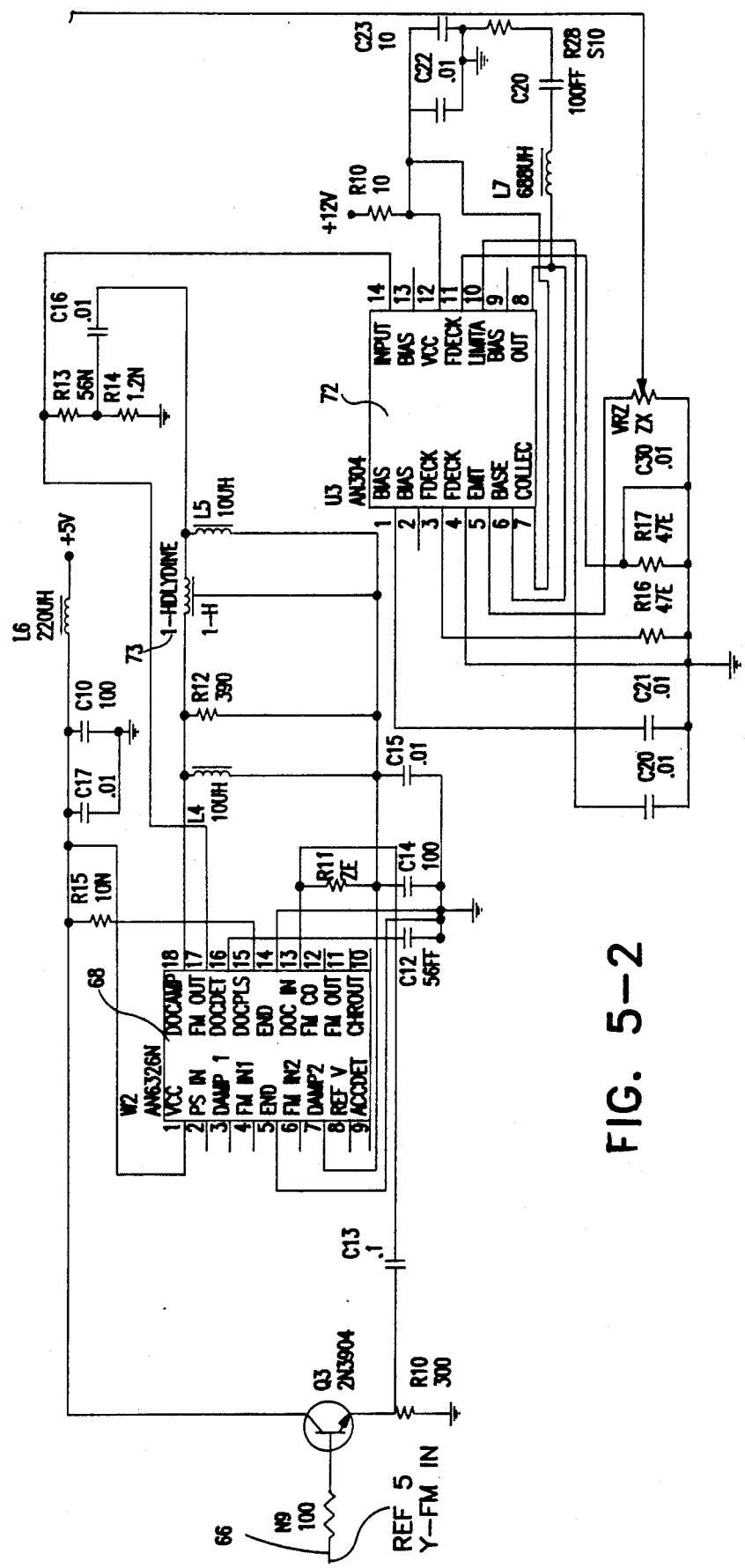

Referring to FIG. 5, the chroma (C 629) is tapped from contact 62 at reference point 6 after the signal has been processed and restored to its proper level. The signal is fed into the base of Q2 to maintain a proper impedance between circuits. From the collector of Q2 through VR1 the signal goes into one side of a double throw analog switch 64. FM luminas (Y-FM) are tapped from contact 66 at reference point 5 and the signal is fed to the base of Q3, for impedance matching. From this transistor Q3, the FM luminas signal is fed into U2 designated 68.

This IC 73 with a H-1 delay forms a drop out compensator (DOC) for this FM signal. After the DOC, the signal is routed through U3 designated 72 where the signal is limited to achieve a stable signal. The output of the limiter 72 is fed to one side of the double throw analog switch U4 designated 64. The DT analog switch 64 is used to switch between positions A and B (FIG. 2). Ref points 5 and 6 are in deck 1 and Ref points 1, 2, 3 and 4 are in deck 2.

In FIG. 1 block 24 is an encoded or copy protect signal circuit. This encoded signal circuit, shown in detail in FIG. 3, has two functions: 1) to prevent a "black box" loop through recording of copy protected tapes which can be used to circumvent the copy protection signals being applied to video tapes by some manufacturers; and 2) to prevent VCR-2 from copying protected tapes having a copy protection signal.

Figure 3:
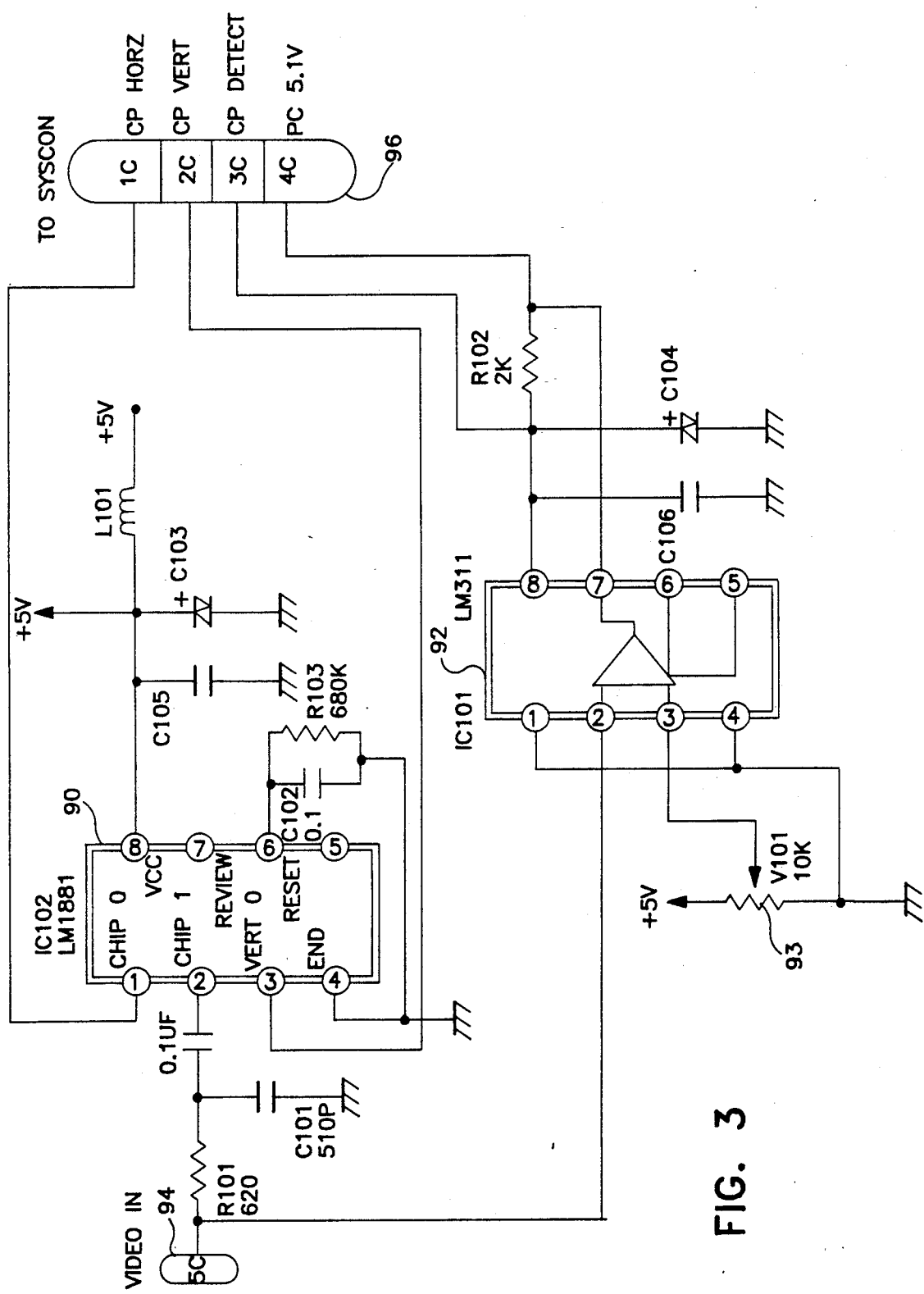
FIG. 3 is a detailed block diagram showing the copy protection signal detector.

FIG. 3 shows the schematic of circuitry used in this block to detect copy protected tapes, and FIG. 4 shows one type of waveform which is added, during vertical blanking, to the video signal which implements this copy protection arrangement. The video signal from either deck is input to the circuit shown in FIG. 3. The circuitry separates out the horizontal, the vertical and a copy protect signal. These signals are input to the system CPU (central processing unit) 14 which compares them to stored patterns. If a copy protect signal is found by the CPU, the system prevents the copy from being made. Many different patterns may be used in the system since the protection pattern is stored in memory. In this preferred embodiment, the Go-Video inscription is a series of pseudo synch pulses added during the vertical blanking time.

The video signal from the selected deck is input 94 to the circuitry shown in FIG. 3. This video signal is filtered by R101 and C101 and capacitively coupled through a capacitor to IC102 designated 90. This IC separates out the horizontal from the vertical synch signals. These signals are output through the connector 96 to the CPU 14. The CPU will compare these signals to stored signals and if there are differences the CPU will prevent the copying of the suspect tape. In addition, the video signal is input directly to a level comparator 92. The comparator is biased by the potentiometer 93. The bias is set to detect signals beyond the normal levels, such as is found in the copy protection signal used by certain companies. If the video signal level is higher than the bias setting the comparator 92 sends a high signal to the CPU via the connector 96.

The signals input to the CPU will be compared to stored signals by the CPU and if there are differences the CPU will prevent copy protected tapes from being duplicated.

Figure 4A:
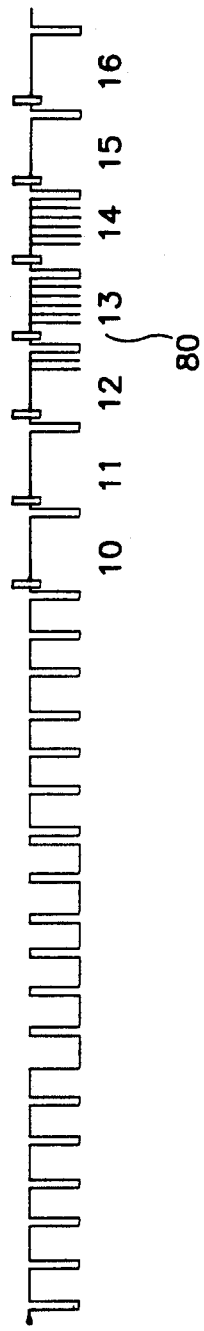
FIGS. 4A and 4B show some of the signals produced and/or detected in the copy protection signal circuit.
Figure 4B:
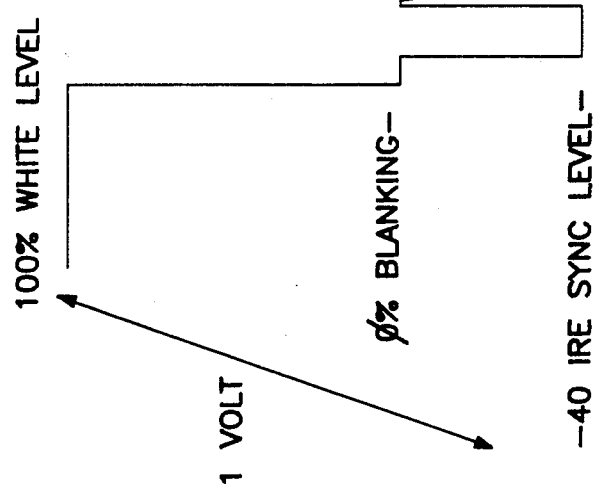

Referring to FIGS. 4A and 4B, five pseudo synch pulses 80 are added to lines 13 and 14. The trace 81 in FIG. 4B shows the pseudo pulses in detail. There is a 2 microsecond negative pulse repeated every 7 microseconds five times. These pseudo synchs go from the 0% blanking level to the −40 IRE level. Since these extra pulses are below the blanking level there will be no interference with the AGC (automatic gain control) operation of a tape player, so these pseudo synch pulses will not interfere with normal viewing of a tape. This protection arrangement is contrasted with other arrangements which prevent the normal playing of a tape by causing the AGC to make a tape unviewable. Also, since in the A or Y-FM 3.4–4.4 MHz and C-hetrodyne processing position of switch 26 everything that comes from the tape being played can be duplicated onto the tape being recorded, any copy protect signal can be duplicated onto the duplicate tape, or the controller CPU 14 can prevent the copying.

The circuit, after determining that there is a copy protect signal, checks to determine whether both decks are synchronized for a period of one or two minutes. If so, then copying is ceased, since, unless one deck is copying from the other deck the signals would not be synchronized for such a long period of time. This phase comparison is performed by element 52 in FIG. 2.

The present VCR has a drop out compensation feature. When a line drop out is detected, the previous line, which was stored in a delay line is substituted for the missing or "dropped out" line. This feature is built into commercially available ICs (integrated circuits) handling the video signals used in this embodiment. When the HQ Copy switch 26 is in the A or Y-FM 3.4–4.4 MHz and C-hetrodyne process position, the video section is bypassed and not used on the tape being recorded (the duplicate tape). But, when a drop out is detected the CPU controller switches the HQ Copy switch 26 to the B position which allows the video to come through the modulator 16, and the previously stored video line is fed through to be recorded onto the duplicate tape. When that line has been recorded the controller places the HQ Copy switch 26 back to the Y-FM 3.4–4.4 MHz and C-hetrodyne process position, the A position, and only that one line of video is recorded onto the duplicate tape.

Also, the display on the front panel 4 is shared between the two decks. When the user is programming or changing one deck the parameters associated with that deck are displayed, and when the other deck is being programmed or changed its parameters are displayed.

Figure 6:
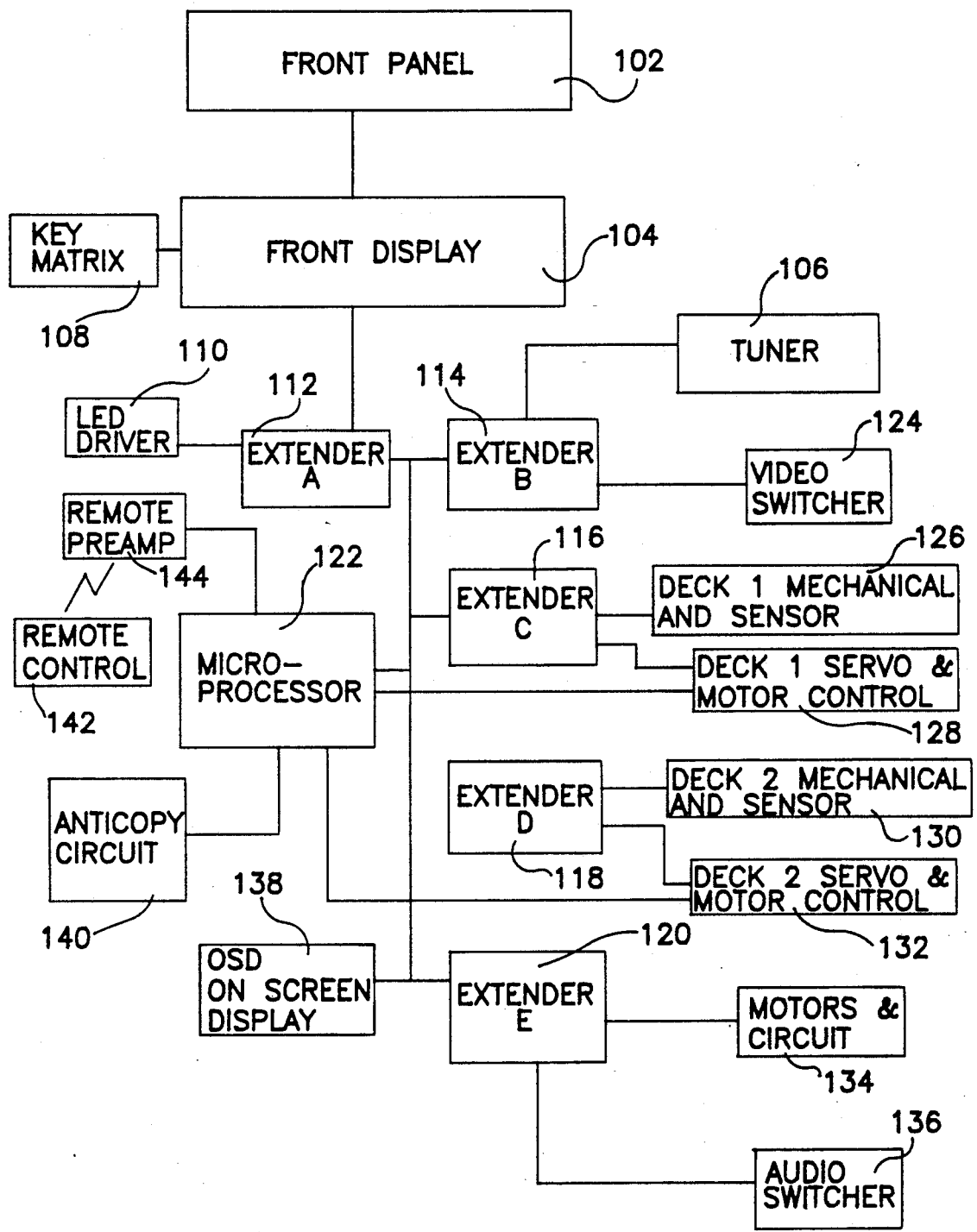
FIG. 6 is another block diagram of a dual deck VCR showing it from the microprocessor viewpoint.

FIG. 6 is a block diagram of the microprocessor circuit showing some of the features of the dual deck VCR which it controls. The microprocessor 122 has extenders A-E. Extender A, 112 controls the front display 104, which is associated with the front panel clock and display 102. The front display 104 is like a dumb terminal, and the key matrix 108 is connected with it.

The tuner 106, of the VCR is connected to extender B, 114, as is the video switcher 124. Extender C, 116 controls the mechanical devices and sensor 126 for deck one as well as the servo and motor control 128 for deck 1, while the latter (128) is also controlled directly by the microprocessor 122 itself. The mechanical devices and sensor 130 for deck two as well as the servo and motor control 132 for deck 2 is controlled by extender D, 118, while the servo and motor control 132 is also controlled directly by the microprocessor 122 itself. Extender E, 120 controls the multi audio system 136 and the audio decoder from the tuner 106, while the on screen display 138 is directly controlled by the microprocessor 122. The motors and circuitry 134 associated with them are controlled by Extender E.

The anticopy circuit 140 is directly connected to the microprocessor 122 and the remote control 142 controls the remote preamplifier 144 which is controlled by the microprocessor 122. There is a LED driver 110 connected to Extender A, 112.

Figure 7:
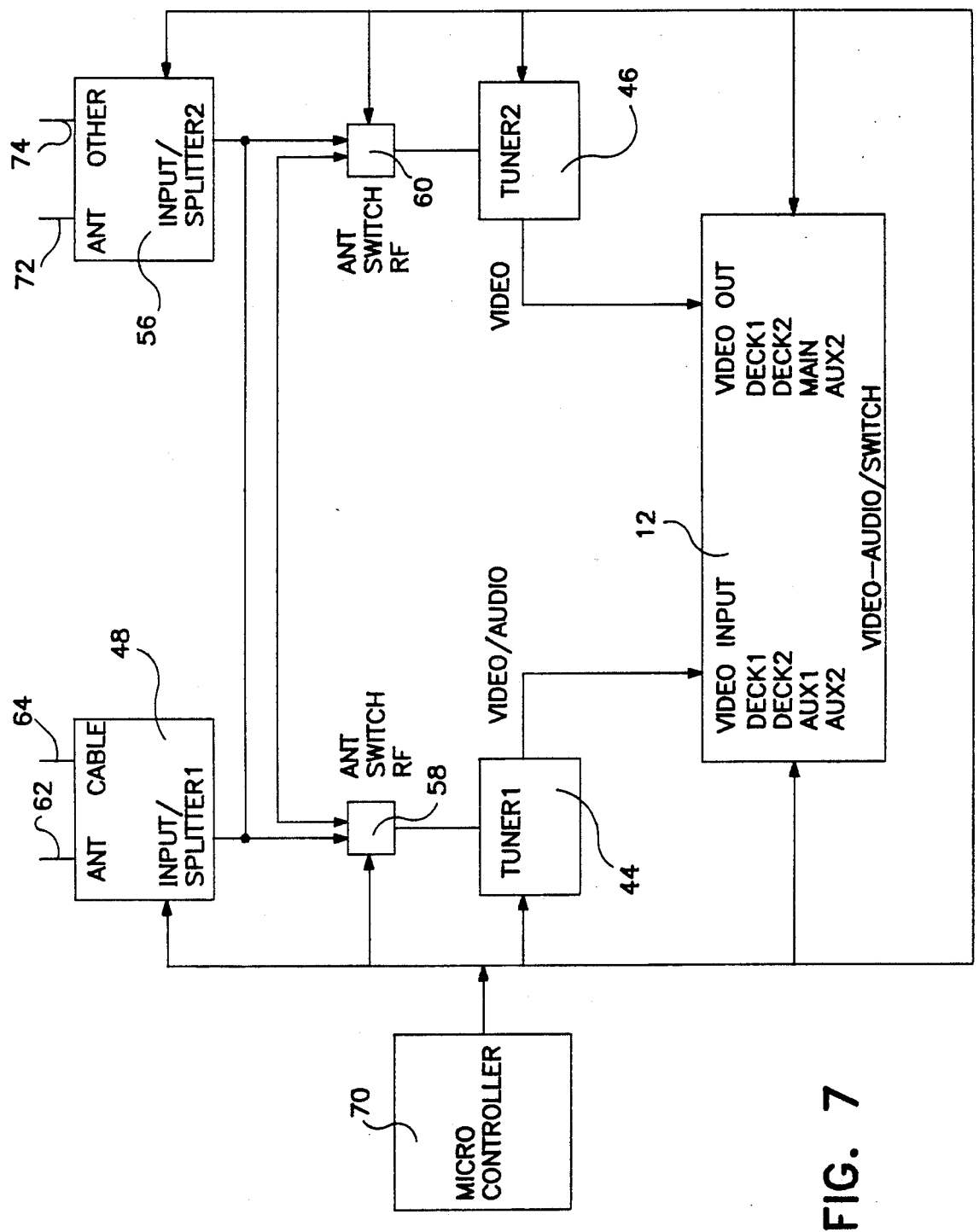
FIG. 7 is a further embodiment in which there are internal switches provided to simplify the cable hook-up for the user.

FIG. 7 shows an arrangement in which the connection of the cables to the back of the VCR is simplified. This is accomplished by providing for internal switching to reduce the number of cables which would otherwise need to be connected to the back of the unit. There are two input splitters 48 and 56 for decks 1 and 2, respectively. The deck one splitter 48 has an antenna connection which provides commercial video broadcast signals to RF antenna switch 58 and to tuner 44, while the deck two splitter 56 has an antenna connection which provides satellite or commercial video broadcast signals to RF antenna switch 60 and to tuner 46. The second input to splitter 48 can be Cable TV, while the second input to splitter 56 can be a camera, or another type of Cable TV, or from another VCR.

Antenna switches 58 and 60 are arranged to provide any signal in one of them, to the other of them and thus any signal being input can be directed to either deck, to both decks at the same time, to the TV monitor, or to any other input/output provided in the system. There are also two tuners 44 and 46, one for each deck. Also there is video-audio switch 12. Further there is the micro controller 70. Thus, two different programs can be recorded at the same time, from commercial TV, or one from commercial TV and one from Cable TV, and, at the same time, the viewer can be watching a third program which could be commercial TV. The detailed switching needed to provide such variations and flexibility is provided by the switching within the Dual Deck System and it is all transparent to the user, who only needs to hook up the few input and output cables in the back of the units and then everything else is accomplished by the electronics. These would include the cables from the antenna for commercial TV, cable TV and the other inputs, which could include an input from a satellite dish. Also, at least one output cable is connected to the TV set for viewing.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

We claim:
1. A dual deck video cassette recorder, comprising:
   a. first and second video deck means in a common housing, and each having heads both of said deck means being capable of playback, and at least one of said deck means being capable of recording;
   b. switch means connected with both deck means for allowing selective connections of video and audio signals between, and from the inputs to and outputs from, the two deck means;

c. means for sensing the angular position of heads of each deck means to assure they are in phase prior to initiating recording; and d. means for correcting the angular position of the heads of at least one of said deck means to assure the heads of each will be in the same angular phase prior to initiating recording.

2. A dual deck video cassette recorder, as defined in claim 1, wherein each deck means has mechanical and sensor means for sensing the positions of the heads of both deck means.

3. A dual deck video cassette recorder, as defined in claim 1, wherein each deck means has servo and motor control means to provide for placing the heads into synchronized angular positions prior to recording.

4. A dual deck video cassette recorder, as defined in claim 2, wherein each deck means has servo and motor control means to provide for placing the heads into synchronized angular positions prior to recording.

5. A dual deck video cassette recorder comprising:

a. first and second video deck means in a common housing, both of said deck means being capable of playback, and at least one of said deck means being capable of recording;

b. switch means connected with both deck means for allowing selective connections of video and audio signals between, and from the inputs to and outputs from, the two deck means;

c. means for detecting a copy protection signal on a tape in one deck means during vertical blanking and the signal being located and timed so that it will not interfere with normal operation of the video signals, to produce a quality picture on a TV monitor or place information onto tape in one deck means which provides a quality picture;

d. means for ceasing, and preventing, any copying function being performed when the copy protection signal has been detected; and means for determining, after the copy protection signal has been detected, the length of time the signals at both deck means are synchronized for a predetermined period of time.

6. A dual deck video cassette recorder, as defined in claim 5, further comprising means for detecting synchronization of the signals at both deck means for said predetermined time period.

7. A dual deck video cassette recorder as defined in claim 5, wherein the copy protection signal is detected during vertical blanking, a special signal includes extra pseudo syncs which are located on line 13, 14, there are five pulses per line, they are 2 microseconds wide, there are seven microseconds between the start of each pulse, the special signal is on both fields, and the special signal is −40 IRE, and where all of the extra pulses are below the blanking level so as not to interfere with AGC or vertical blanking signals.

8. A dual deck video cassette recorder, comprising:

a. first and second video deck means in a common housing, and each having heads both of said deck means being capable of playback, and at least one of said deck means being capable of recording;

b. switch means connected with both deck means for allowing selective connections of video and audio signals between, and from the inputs to and outputs from, the two deck means;

c. at least two types of duplicating circuit means, one being a Y-FM lumina 3.4–4.4 MHz and C-heterodyne process and the other a modulated duplicate or composite video;

d. means for sensing the quality of the signals recorded on a source tape;

e. means for connecting one of said duplicating circuit means to perform copying of the information on one tape onto anther tape in dependence upon the quality of signal tested;

f. means for sensing the angular position of the heads of each deck means to assure they are in phase prior to initiating recording when the duplicating circuit means using the Y-FM lumina 3.4–4.4 MHz and C-heterodyne process is used; and g. means for correcting the angular position of the heads of at least one of said deck means to assure the heads of each will be in the same angular phase.

9. A dual deck video cassette recorder as defined in claim 8, further comprising:

h. means for detecting a copy protection signal on a tape in one deck means during vertical blanking and the signal being located and timed so that it will not interfere with normal operation of the video signals, to produce a quality picture on a TV monitor or place information onto tape in one deck which provides a quality picture; and i. means for ceasing, and preventing, any copying function being performed when the copy protection signal has been detected.

10. A dual deck video cassette recorder, as defined in claim 9, further comprising means for determining, after the copy protection signal has been detected, the length of time the signals at both decks are synchronized for a predetermined period of time.

11. A dual deck video cassette recorder, as defined in claim 9, further comprising means for detecting synchronization of the signals at both deck means for said predetermined time period.

12. A dual deck video cassette recorder as defined in claim 11, wherein said means for ceasing and preventing copying is actuated when said synchronization detecting means has detected synchronization of the signals at both deck means for the predetermined period of time.

13. A dual deck video cassette recorder as defined in claim 8, further comprising:

h. first and second video tuner means connected to said first and second video deck means, respectively;

i. first and second signal splitters, having inputs arranged to be connected to an antenna and at least one other video input and to the tuner means and a microprocessor;

j. first and second video RF switches, connected between signal splitter inputs and the tuner means of that deck means and to a microprocessor;

k. a television set;

l. said switch means being connected with both deck means for allowing selective connections of video and audio signals between, and from the inputs to and outputs from, the two deck means, and for connecting the input or output to or from either of said deck means to the television set; and m. said system being constructed and arranged so that when desired the viewer may: 1) record one commercial TV broadcast on one of said deck means, 2) record another commercial TV broadcast on the other of said deck means, and 3) watch a third commercial TV broadcast on the TV set.

14. A dual deck video cassette recorder system including a video cassette recorder as defined in claim 11, and means for placing extra pseudo syncs during the copying of a tape and during vertical blanking so that the syncs are located on line 13, 14, there are five pulses per line, they are 2 microseconds wide, there are seven microseconds between the start of each pulse, the extra pseudo synchs are on both fields, and the extra pseudo synchs are −40 IRE, and where all of the extra pulses are below the blanking level so as not to interfere with AGC or vertical blanking signals.

* * * * *